United States Patent
Shimamura et al.

(10) Patent No.: US 8,647,725 B2
(45) Date of Patent: Feb. 11, 2014

(54) CELLULOSE ACYLATE FILM, POLARIZING PLATE AND LIQUID CRYSTAL DISPLAY DEVICE

(75) Inventors: Satoshi Shimamura, Minami-ashigara (JP); Nobutaka Fukagawa, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 826 days.

(21) Appl. No.: 12/750,083

(22) Filed: Mar. 30, 2010

(65) Prior Publication Data

US 2010/0245728 A1 Sep. 30, 2010

(30) Foreign Application Priority Data

Mar. 31, 2009 (JP) ................................. 2009-087820

(51) Int. Cl.
*C09K 19/00* (2006.01)
(52) U.S. Cl.
USPC ............ 428/1.33; 426/1.1; 426/1.3; 426/524; 426/525; 528/220; 528/227; 349/96; 349/117; 349/119
(58) Field of Classification Search
USPC .......... 428/1.1, 1.3, 1.33, 524, 525, 526, 527; 522/94, 166; 528/129, 227, 220; 349/96, 117, 119
See application file for complete search history.

(56) References Cited

U.S. PATENT DOCUMENTS

| | | | |
|---|---|---|---|
| 2008/0145325 A1* | 6/2008 | Coffey-Dawe et al. | 424/61 |
| 2008/0213511 A1* | 9/2008 | Ikeda et al. | 428/1.31 |
| 2009/0012245 A1* | 1/2009 | Glockner et al. | 526/64 |

FOREIGN PATENT DOCUMENTS

| | | |
|---|---|---|
| JP | 2003-183417 A | 7/2003 |
| JP | 2006-291192 A | 10/2006 |
| WO | WO 2008/102647 A1 | 8/2008 |

OTHER PUBLICATIONS

Machine English translation of JP 2003-183417A, Sep. 2012.*

* cited by examiner

*Primary Examiner* — Gwendolyn Blackwell
*Assistant Examiner* — Ruiyun Zhang
(74) *Attorney, Agent, or Firm* — Buchanan Ingersoll & Rooney PC

(57) ABSTRACT

A cellulose acylate film, containing an acyl-modified compound of a reduction product of a ketone compound-formaldehyde polymer, a polarizing plate containing the film as transparent protective film, and a liquid crystal display device having the polarizing plate.

8 Claims, 2 Drawing Sheets

CELLULOSE ACYLATE FILM, POLARIZING PLATE AND LIQUID CRYSTAL DISPLAY DEVICE

FIELD OF THE INVENTION

The present invention relates to a cellulose acylate film showing excellent reverse dispersibility, a polarizing plate containing the film as transparent protective film, and a liquid crystal display device having the polarizing plate.

BACKGROUND OF THE INVENTION

A liquid crystal display device is increasingly used year by year for a space-saving and less power-consuming image display device. It has been conventionally a drawback of the liquid crystal display device that the viewing-angle dependency of the displayed image is large, but a wide viewing-angle liquid crystal mode so-called VA mode is put into practical use and this allows rapid expansion of the demand for a liquid crystal display device also in the market where a high-quality image is required, such as television. A VA-mode liquid crystal display device is advantageously assured of high contrast as compared with other liquid crystal display modes but has a problem that the contrast and color tint are greatly changed depending on the viewing angle.

As a solution for this problem, a method of using a phase difference film having reverse dispersibility (also referred to as positive wavelength dispersion characteristics) in which a phase difference is larger as a wavelength increases is effectively used. For example, WO 08/102,647 pamphlet discloses a method of using two biaxially-oriented films in which both in-plane retardation (Re) and retardation for the thickness direction (Rth) show reverse dispersibility, and JP-A-2006-291192 ("JP-A" means unexamined published Japanese patent application) discloses a method of using two biaxially-oriented films, in which Re shows reverse dispersibility and Rth shows forward dispersibility, in combination.

Cellulose acylate films, if they are composed of a single polymer as film-constituting polymer, both Re and Rth have reverse dispersibility and are thus favorable for the object above. Because the cellulose acylate films are highly transparent and readily adhesive to polyvinylalcohol that is used as polarizer, they have been widely used as a polarizing plate-protective film. Recently, under demand for reduction in a thickness of liquid crystal display devices, studies aimed at providing such a cellulose acylate film with functions of both a polarizing plate-protective film and a phase difference film by providing it with phase difference characteristics, and additionally making the film itself thinner are under progress. However when a film made only of cellulose acylate is made thinner, the film shows increased moisture permeability, and thus, causing a problem that the display performance of the resulting liquid crystal display device deteriorates under high temperature and high humidity.

A method of adding a compound more hydrophobic than cellulose acylate to the film is studied to overcome the problem, and, specifically, JP-A-2003-183417 discloses a method of adding a ketone resin. However, these compounds also have a problem that the decrease in moisture permeability of the cellulose acylate film is not sufficient or the reverse dispersibility of retardation are reduced, and there exist needs for improvement.

SUMMARY OF THE INVENTION

The present invention resides in a cellulose acylate film, comprising an acyl-modified compound of a reduction product of a ketone compound-formaldehyde polymer.

Further, the present invention resides in a polarizing plate, comprising a polarizing film and two transparent protective films placed on both sides of the polarizing film, wherein at least one of the transparent protective films is the cellulose acylate film described in the above item.

Further, the present invention resides in a liquid crystal display device, comprising a liquid crystal cell and two polarizing plates set on both sides of the liquid crystal cell, wherein at least one of the polarizing plates is the polarizing plate described in the above item.

Further, the present invention resides in an acyl-modified compound of a reduction product of a ketone compound-formaldehyde polymer represented by the following Formula (I):

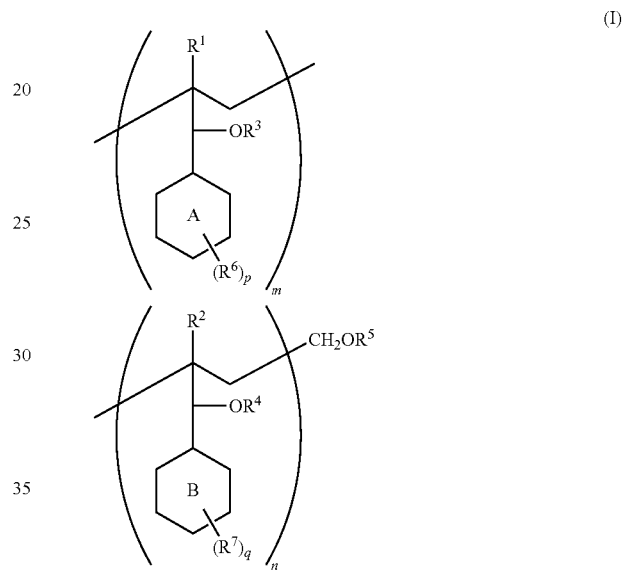

(wherein, $R^1$ and $R^2$ each independently represent a hydrogen atom or an alkyl group having 1 to 4 carbon atoms; $R^3$, $R^4$ and $R^5$ each independently represent a hydrogen atom, a formyl group or an alkylcarbonyl group having 2 to 15 carbon atoms, but not all of them represent hydrogen atoms; A and B each independently represent an aryl group having 6 to 10 carbon atoms; $R^6$ and $R^7$ each independently represent a hydrogen atom, a halogen atom or an alkyl or alkoxy group having 1 to 6 carbon atoms; m and n each independently represent an integer of 0 or 1 or more, but are not 0 simultaneously; p and q are each independently 0 or an integer of 1 or 2).

Other and further features and advantages of the invention will appear more fully from the following description.

DETAILED DESCRIPTION OF THE INVENTION

Figure 1:
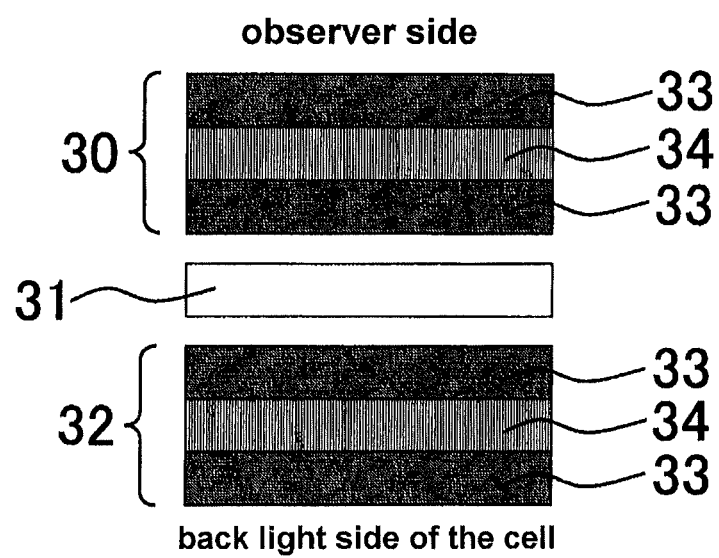
FIG. 1 is a schematic cross-sectional view illustrating an example of a display mode of a liquid crystal display device according to the present invention.

The inventors have found that a cellulose acylate film containing an acyl-modified compound of the reduction product of a ketone compound-formaldehyde polymer having a particular structure shows high reverse dispersibility and is low haze and moisture permeability.

The inventors also found that an acyl-modified compound that is the reduction product of a ketone compound-formaldehyde polymer having a molar absorption coefficient of 2000 or less in a wavelength range of 230 to 700 nm is superior in compatibility with cellulose acylate and that addition thereof to a cellulose acylate film makes the cellulose acylate film show greater reverse dispersibility and become lower in haze and moisture permeability.

The present invention has been made, after intensive studies to solve the problems in view of the described above circumstances. Namely, the present invention relates to a cellulose acylate film described below, a polarizing plate and a liquid crystal display device containing the same, and the compounds contained in the film.

<1> A cellulose acylate film, comprising an acyl-modified compound of a reduction product of a ketone compound-formaldehyde polymer.

<2> The cellulose acylate film described in the above item <1>, wherein the reduction product of a ketone compound-formaldehyde polymer is that of an alkyl aryl ketone-formaldehyde polymer.

<3> The cellulose acylate film described in the above items <1> or <2>, wherein the acyl-modified compound is a compound represented by the following Formula (I):

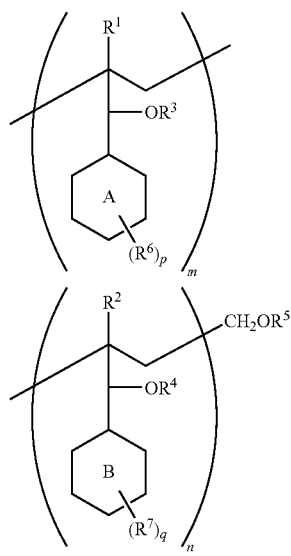

(wherein, $R^1$ and $R^2$ each independently represent a hydrogen atom or an alkyl group having 1 to 4 carbon atoms; $R^3$, $R^4$ and $R^5$ each independently represent a hydrogen atom, a formyl group or an alkylcarbonyl group having 2 to 15 carbon atoms, but not all of them represent hydrogen atoms; A and B each independently represent an aryl group having 6 to 10 carbon atoms; $R^6$ and $R^7$ each independently represent a hydrogen atom, a halogen atom or an alkyl or alkoxy group having 1 to 6 carbon atoms; m and n each independently represent an integer of 0 or 1 or more, but are not 0 simultaneously; p and q are each independently 0 or an integer of 1 or 2).

<4> The cellulose acylate film described in any one the above items <1> to <3>, wherein the molar absorption coefficient of the acyl-modified compound of the reduction product of a ketone compound-formaldehyde polymer is 2000 or less in a wavelength range of 230 to 700 nm.

<5> The cellulose acylate film described in any one the above items <1> to <3>, wherein a number average molecular weight of the acyl-modified compound of the reduction product of a ketone compound-formaldehyde polymer is 500 or more and 1500 or less.

<6> The cellulose acylate film described in any one the above items <1> to <5>, wherein in-plane retardation (Re) and retardation in a thickness direction (Rth), as determined at a measurement wavelength of 548 nm, satisfy relationships represented by the following formulae (1) and (2) and both Re and Rth have higher reverse dispersibility along with the increase of wavelength measured.

$$30 \text{ nm} \leq Re(548) \leq 150 \text{ nm} \quad \text{formula (1)}$$

$$70 \text{ nm} \leq Rth(548) \leq 300 \text{ nm} \quad \text{formula (2)}$$

(wherein, Re(548) and Rth(548) represent respectively the in-plane retardation and the retardation for the thickness direction at a wavelength of 548 nm).

<7> A polarizing plate, comprising a polarizing film and two transparent protective films placed on both sides of the polarizing film, wherein at least one of the transparent protective films is the cellulose acylate film described in any one of the above items <1> to <6>.

<8> A liquid crystal display device, comprising a liquid crystal cell and two polarizing plates set on both sides of the liquid crystal cell, wherein at least one of the polarizing plates is the polarizing plate described in the above item <7>.

<9> The liquid crystal display device described in the above item <8>, wherein a display mode of the liquid crystal display device is a VA mode.

<10> An acyl-modified compound of a reduction product of a ketone compound-formaldehyde polymer represented by the following Formula (I).

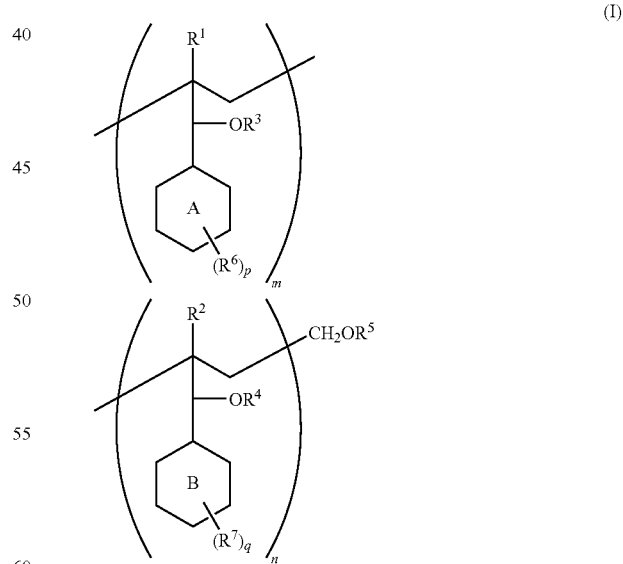

(wherein, $R^1$ and $R^2$ each independently represent a hydrogen atom or an alkyl group having 1 to 4 carbon atoms; $R^3$, $R^4$ and $R^5$ each independently represent a hydrogen atom, a formyl group or an alkylcarbonyl group having 2 to 15 carbon atoms, but not all of them represent hydrogen atoms; A and B each independently represent an aryl group having 6 to 10 carbon atoms; $R^6$ and $R^7$ each independently represent a hydrogen atom, a halogen atom or an alkyl or alkoxy group having 1 to 6 carbon atoms; m and n each independently represent an integer of 0 or 1 or more, but are not 0 simultaneously; p and q are each independently 0 or an integer of 1 or 2).

Hereinafter, the present invention will be described in detail. In the pre sent specification, "to" denotes a range including numerical values described before and after it as a minimum value and a maximum value.

[Cellulose Acylate Film]

The cellulose acylate film according to the present invention preferably contains an acyl-modified compound of a reduction product of a ketone compound-formaldehyde polymer represented by the following Formula (I).

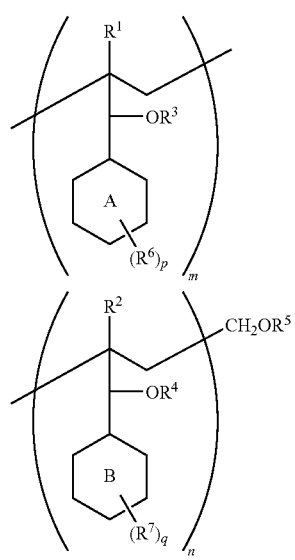

(wherein, $R^1$ and $R^2$ each independently represent a hydrogen atom or an alkyl group having 1 to 4 carbon atoms; $R^3$, $R^4$ and $R^5$ each independently represent a hydrogen atom, a formyl group or an alkylcarbonyl group having 2 to 15 carbon atoms, but not all of them represent hydrogen atoms; A and B each independently represent an aryl group having 6 to 10 carbon atoms; $R^6$ and $R^7$ each independently represent a hydrogen atom, a halogen atom or an alkyl or alkoxy group having 1 to 6 carbon atoms; m and n each independently represent an integer of 0 or 1 or more, but are not 0 simultaneously; p and q are each independently 0 or an integer of 1 or 2).

The polymer represented by Formula (I), when m and n are both not 0, may be a block copolymer, a random copolymer or a graft copolymer.

Hereinafter, the acyl-modified compound of the reduction product of a ketone compound-formaldehyde polymer, the cellulose acylate, the additives, and the film-forming method will be described in this order.

The ketone compound-formaldehyde polymer according to the present invention includes an alternating copolymer unit where a unit derived from a ketone compound and a unit derived from formaldehyde are alternately arranged.

The ketone compound-formaldehyde polymer (resin) is already known from a long time ago. As for a method of producing the ketone compound-formaldehyde polymer, a usual method known is to allow a ketone compound to react with formaldehyde mutually in the presence of a base. Examples thereof are described in DE 3324287, U.S. Pat. No. 2,540,885, U.S. Pat. No. 2,540,886, DE 1155909, DD 12433, DE 1300256, DE 1256898 and the like.

The reduction product of a ketone compound-formaldehyde polymer is a product where a carbonyl group in the ketone compound-formaldehyde polymer is reduced to a hydroxyl group. The reduction product of a ketone compound-formaldehyde polymer is not particularly limited, if the polymer has hydroxyl groups that can be acylated. The acyl-modified compound is a compound obtained by acylation of hydroxyl groups in the reduction product of the ketone compound-formaldehyde polymer. Examples of the ketone compounds include acetophenone, cyclohexanone and the like, and among them, acetophenone is preferable.

[Acyl-Modified Compound of the Reduction Product of a Ketone Compound-Formaldehyde Polymer]

The acyl-modified compound of the reduction product of a ketone compound-formaldehyde polymer added to the cellulose acylate film according to the present invention is preferably an acyl-modified compound represented by Formula (1) above. The acyl group is preferably a formyl group or a substituted or unsubstituted alkylcarbonyl group having 2 to 15 carbon atoms, and in particular, an acetyl group, a propionyl group, a butyryl group or a pivaloyl group is more preferable, and an acetyl group is most preferable.

The cellulose acylate film according to the present invention, which contains an acyl-modified compound of the reduction product of a ketone compound-formaldehyde polymer, preferably an acyl-modified compound represented by Formula (I), shows high reverse dispersibility, low haze and low moisture permeability.

The acyl-modified compound of the reduction product of a ketone compound-formaldehyde polymer according to the present invention should be obtained by acylation of the hydroxyl groups of the reduction product of a ketone compound-formaldehyde polymer, and 50 to 100% of the hydroxyl groups are preferably acylated. The acylation rate is more preferably 70 to 100%, still more preferably 90 to 100%. Increase in acylation rate leads to increase in hydrophobicity of the resin and decrease in moisture permeability of the cellulose acylate film.

Acylation of the hydroxyl groups in the reduction product of a ketone compound-formaldehyde polymer can be carried out by any production method, if the hydroxyl groups can be acylated. Examples of the acylation methods include formylation, acetylation, propionylation, butyrylation, isobutyrylation, valerylation, isovalerylation and the like, and preferable among them is acetylation. In the case of acetylation, as described in J. Mol. Biol., 1972, 72, 219 and Synthesis, 1975, 222, it may be carried out by a typical method in which an acetylating agent such as acetic anhydride or acetyl chloride is used. Similarly, propionylation, butyrylation or the like can also be carried out by a known esterification method using the corresponding acid chloride.

A readily commercially available raw material (such as Degussa product) may be used as the base reduction product of a ketone compound-formaldehyde polymer to be acylated. It may alternatively be produced by a known method. For example, West German Patent No. 870022 describes a method of reducing a formaldehyde polymer produced by using an alkyl aryl ketone as a ketone compound, Alternatively, JP-A-11-12338 describes a method of reducing a formaldehyde polymer prepared by using a cyclic ketone (such as cyclohexanone) as a ketone compound. In each of the methods, a reduction product of the ketone compound-formaldehyde polymer is produced by hydrogenation reduction of a precursor ketone compound-formaldehyde polymer in the presence of a nickel, palladium or ruthenium catalyst, and then, carbonyl groups are reduced to hydroxyl groups.

Various polymers obtained by reaction of various ketone compounds with formaldehyde in the presence of alkaline catalyst by a known method can be used as the precursor ketone compound-formaldehyde polymers (e.g., West German Patent No, 892975), Examples of the ketone compounds include cyclohexanone, methylcyclohexanone, acetophenone, methylacetophenone, acetylethylbenzene, acetylpropylbenzene, acetylchlorobenzene and long-chain alkyl group-containing alkylphenylketones such as propiophenone, butylophenone and acetyltetrahydronaphthalene, and the like. Among the compounds above, acetophenone, methylacetophenone and acetylethylbenzene are preferable, and acetophenone is more preferable, Examples of the alkaline catalysts include sodium hydroxide, potassium hydroxide and the like.

Specific examples of the acyl-modified compound of the reduction product of the ketone compound-formaldehyde represented by formula (1) will be listed below, but the present invention is not limited thereby. In the formula, Me represents a methyl group.

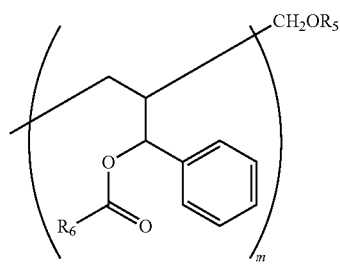

| $R_5, R_6 =$ | —H | (A-01) |
| | —$CH_3$ | (A-02) |
| | —$CH_2CH_3$ | (A-03) |
| | —$(CH_2)_2CH_3$ | (A-04) |
| | —$(CH_2)_3CH_3$ | (A-05) |
| | —$(CH_2)_4CH_3$ | (A-06) |
| | —$CH(CH_3)_2$ | (A-07) |
| | —$CH_2CH(CH_3)_2$ | (A-08) |
| | —$C(CH_3)_3$ | (A-09) |

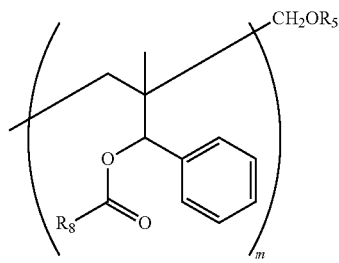

| $R_5, R_8 =$ | —H | (A-11) |
| | —$CH_3$ | (A-12) |
| | —$CH_2CH_3$ | (A-13) |
| | —$(CH_2)_2CH_3$ | (A-14) |
| | —$(CH_2)_3CH_3$ | (A-15) |
| | —$(CH_2)_4CH_3$ | (A-16) |
| | —$CH(CH_3)_2$ | (A-17) |
| | —$CH_2CH(CH_3)_2$ | (A-18) |
| | —$C(CH_3)_3$ | (A-19) |

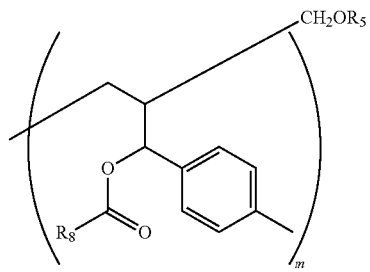

| $R_5, R_8 =$ | —H | (A-21) |
| | —$CH_3$ | (A-22) |
| | —$CH_2CH_3$ | (A-23) |
| | —$(CH_2)_2CH_3$ | (A-24) |
| | —$(CH_2)_3CH_3$ | (A-25) |
| | —$(CH_2)_4CH_3$ | (A-26) |
| | —$CH(CH_3)_2$ | (A-27) |
| | —$CH_2CH(CH_3)_2$ | (A-28) |
| | —$C(CH_3)_3$ | (A-29) |

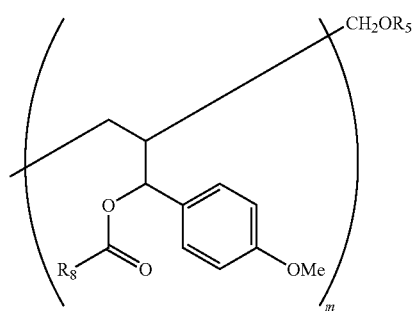

| R$_5$, R$_8$ = | —H | (A-31) |
| --- | --- | --- |
| | —CH$_3$ | (A-32) |
| | —CH$_2$CH$_3$ | (A-33) |
| | —(CH$_2$)$_2$CH$_3$ | (A-34) |
| | —(CH$_2$)$_3$CH$_3$ | (A-35) |
| | —(CH$_2$)$_4$CH$_3$ | (A-36) |
| | —CH(CH$_3$)$_2$ | (A-37) |
| | —CH$_2$CH(CH$_3$)$_2$ | (A-38) |
| | —C(CH$_3$)$_3$ | (A-39) |

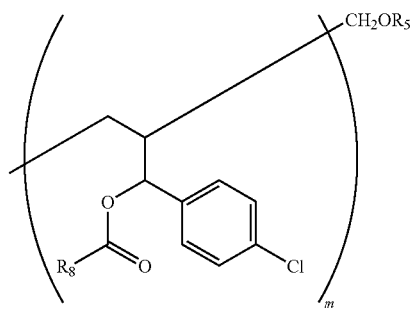

| R$_5$, R$_8$ = | —H | (A-51) |
| --- | --- | --- |
| | —CH$_3$ | (A-52) |
| | —CH$_2$CH$_3$ | (A-53) |
| | —(CH$_2$)$_2$CH$_3$ | (A-54) |
| | —(CH$_2$)$_3$CH$_3$ | (A-55) |
| | —(CH$_2$)$_4$CH$_3$ | (A-56) |
| | —CH(CH$_3$)$_2$ | (A-57) |
| | —CH$_2$CH(CH$_3$)$_2$ | (A-58) |
| | —C(CH$_3$)$_3$ | (A-59) |

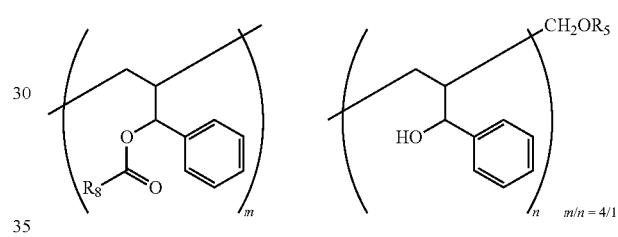

| R$_5$, R$_8$ = | —H | (A-61) |
| --- | --- | --- |
| | —CH$_3$ | (A-62) |
| | —CH$_2$CH$_3$ | (A-63) |
| | —(CH$_2$)$_2$CH$_3$ | (A-64) |
| | —(CH$_2$)$_3$CH$_3$ | (A-65) |
| | —(CH$_2$)$_4$CH$_3$ | (A-66) |
| | —CH(CH$_3$)$_2$ | (A-67) |
| | —CH$_2$CH(CH$_3$)$_2$ | (A-68) |
| | —C(CH$_3$)$_3$ | (A-69) |

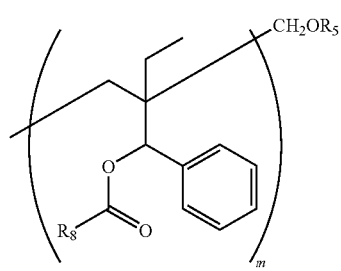

| R$_5$, R$_8$ = | —H | (A-41) |
| --- | --- | --- |
| | —CH$_3$ | (A-42) |
| | —CH$_2$CH$_3$ | (A-43) |
| | —(CH$_2$)$_2$CH$_3$ | (A-44) |
| | —(CH$_2$)$_3$CH$_3$ | (A-45) |
| | —(CH$_2$)$_4$CH$_3$ | (A-46) |
| | —CH(CH$_3$)$_2$ | (A-47) |
| | —CH$_2$CH(CH$_3$)$_2$ | (A-48) |
| | —C(CH$_3$)$_3$ | (A-49) |

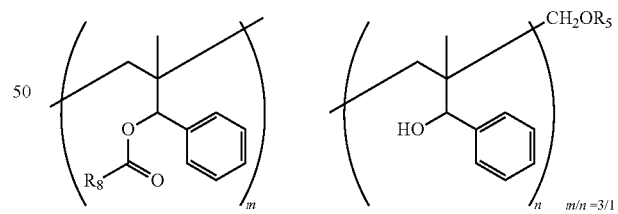

| R$_5$, R$_8$ = | —H | (A-71) |
| --- | --- | --- |
| | —CH$_3$ | (A-72) |
| | —CH$_2$CH$_3$ | (A-73) |
| | —(CH$_2$)$_2$CH$_3$ | (A-74) |
| | —(CH$_2$)$_3$CH$_3$ | (A-75) |
| | —(CH$_2$)$_4$CH$_3$ | (A-76) |
| | —CH(CH$_3$)$_2$ | (A-77) |
| | —CH$_2$CH(CH$_3$)$_2$ | (A-78) |
| | —C(CH$_3$)$_3$ | (A-79) |

-continued

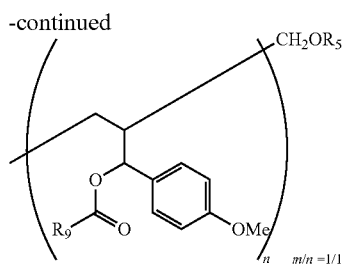

| $R_5, R_8, R_9 =$ | —H | (A-81) |
| --- | --- | --- |
| | —CH$_3$ | (A-82) |
| | —CH$_2$CH$_3$ | (A-83) |
| | —(CH$_2$)$_2$CH$_3$ | (A-84) |
| | —(CH$_2$)$_3$CH$_3$ | (A-85) |
| | —(CH$_2$)$_4$CH$_3$ | (A-86) |
| | —CH(CH$_3$)$_2$ | (A-87) |
| | —CH$_2$CH(CH$_3$)$_2$ | (A-88) |
| | —C(CH$_3$)$_3$ | (A-89) |

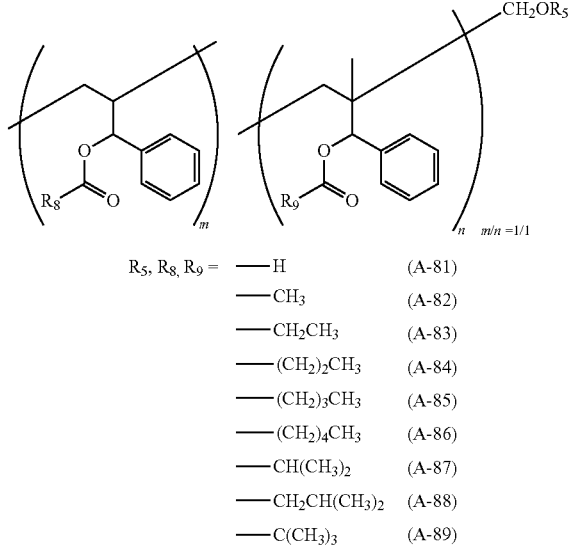

| $R_5, R_8, R_9 =$ | —H | (A-81) |
| --- | --- | --- |
| | —CH$_3$ | (A-82) |
| | —CH$_2$CH$_3$ | (A-83) |
| | —(CH$_2$)$_2$CH$_3$ | (A-84) |
| | —(CH$_2$)$_3$CH$_3$ | (A-85) |
| | —(CH$_2$)$_4$CH$_3$ | (A-86) |
| | —CH(CH$_3$)$_2$ | (A-87) |
| | —CH$_2$CH(CH$_3$)$_2$ | (A-88) |
| | —C(CH$_3$)$_3$ | (A-89) |

<Molar Absorption Coefficient>

The molar absorption coefficient of the acyl-modified compound of the reduction product of a ketone compound-formaldehyde polymer according to the present invention is preferably 2000 or less, more preferably 1500 or less, and still more preferably 1000 or less, in the wavelength range of 230 to 700 nm, When the molar absorption coefficient of the acyl-modified compound of the reduction product of a ketone compound-formaldehyde polymer in the wavelength range of 230 to 700 nm is in the range above, the change in wavelength dispersion due to expression of retardation by the acyl-modified compound of the reduction product of a ketone compound-formaldehyde polymer is small, and thus, a cellulose acylate film high in reverse dispersibility, low in haze and low in moisture permeability is obtained. The molar absorption coefficient can be determined by measuring the absorbance of a solution thereof at a particular mass concentration in a commercially available spectrophotometer (e.g., UV3150 (trade name), manufactured by Hitachi, Ltd.) and dividing the obtained absorbance by its number average molecular weight.

<Number Average Molecular Weight>

Further, the acyl-modified compound of the reduction product of a ketone compound-formaldehyde polymer for use in the present invention preferably has a number average molecular weight of 500 to 6,000, more preferably from 500 to 3,000, still more preferably from 500 to 2,000, and most preferably from 500 to 1,500. Favorably, properties of the film are preserved efficiently at a number average molecular weight of 500 or more, while compatibility with cellulose acylate becomes sufficient, preventing increase in haze at a number average molecular weight of 6000 or less.

<Degree of Dispersion>

The degree of dispersion (distribution of molecular weight) of the acyl-modified compound of the reduction product of a ketone compound-formaldehyde polymer for use in the present invention is normally in the range of 1.05 to 3.0, preferably 1.1 to 2.5, and more preferably 1.1 to 2.0, <Addition Amount>

The addition amount of the acyl-modified compound of the reduction product of a ketone compound-formaldehyde polymer according to the present invention is preferably 1 to 30 parts by mass, more preferably 2 to 25 parts by mass and still more preferably 5 to 20 parts by mass, with respect to 100 parts by mass of the cellulose acylate. The addition amount of 30 parts or less by mass is advantageous in that the haze does not increase, while the addition amount of 1 part or more by mass is advantageous in that the moisture permeability is lowered effectively.

<Content in Film>

In the present invention, the content of the acyl-modified compound of the reduction product of a ketone compound-formaldehyde polymer in the surface layer on at least one face of the film is preferably made higher than that in the film. Here, the film surface layer is an area of the film within 3 μm in the film thickness direction from the film surface, and the region in film is a region of the film excluding the film surface layer from the entire film.

The contents of the acyl-modified compound of the reduction product of a ketone compound-formaldehyde polymer in the film surface layer and in the film can be controlled by casting dopes different in composition simultaneously or sequentially. As for the composition of the dopes, dopes different in concentration of the acyl-modified compound of the reduction product of a ketone compound-formaldehyde polymer are used favorably, It is also possible to make the content of the acyl-modified compound of the reduction product of a ketone compound-formaldehyde polymer in the film surface layer higher than the content thereof in the film, by using a dope containing cellulose acylate having a high acyl substitution degree for the surface layer and a dope containing cellulose acylate having a low acyl substitution degree for the base layer.

It is possible in such a way to make the content of the acyl-modified compound of the reduction product of a ketone compound-formaldehyde polymer in the film surface layer higher than that in the film and to amplify the reduction in moisture permeability caused by the acyl-modified compound of the reduction product of a ketone compound-formaldehyde polymer according to the present invention.

The ratio of the content of the acyl-modified compound of the reduction product of a ketone compound-formaldehyde polymer in the film surface layer to that in the film is preferably 1.05 to 1.5, more preferably 1.05 to 1.4. If the ratio is less than 1.05, reduction in moisture permeability will be insufficient, while, if the ratio is larger than 1.5, unevenness of film strength will be increased, causing a problem of low film dynamic strength during processing.

In the present invention, an acyl-modified compound of the reduction product of a ketone compound-formaldehyde polymer may be blended alone, or two or more compounds may be blended in combination.

[Cellulose Acylate]

As the raw material of cellulose acylate that can be used in the cellulose acylate film of the present invention, any of known cotton materials can be used (e.g., refer to Hatsumei Kyokai Kokai Giho Kogi No. 2001-1745). Further, the synthesis of cellulose acylate can also be performed according to a known manner (e.g., Migita, et al., "Mokuzai Kagaku" ("Wood Chemistry"), pp. 180-190, Kyoritsu Shuppan Co., Ltd. (1968)).

Examples of the cellulose acylates include cellulose acetate, cellulose acetate propionate, and cellulose acetate butyrate.

The degree of acyl substitution of cellulose acylates is preferably 2.0 to 2.97. Herein, the degree of substitution of all acyl groups is a value calculated according to ASTM D817.

The cellulose acetate for use in the present invention preferably has a mass average polymerization degree of 250 to 800, more preferably from 300 to 600. Further, the cellulose acylate for use in the present invention preferably has a number average molecular weight of 70,000 to 230,000, more preferably from 75,000 to 230,000, and most preferably from 78,000 to 120,000.

The value of Mw/Mn (Mw is a mass average molecular mass and Mn is a number average molecular mass) is preferably from 2.0 to 4.0, and more preferably from 2.0 to 3.5.

[Additives]

The cellulose acylate film according to the present invention may contain additives such as retardation-causing agents and plasticizers, in addition to the acyl-modified compound of the reduction product of a ketone compound-formaldehyde polymer.

[Retardation-Causing Agent]

Examples of the retardation-causing agents (Re-causing agents) favorably used include the compounds described in JP-A-2008-20896, paragraphs [0047] to [0077]; the compounds described in ibid., paragraphs [0078] to [0096]; the compounds described in JP-A-2001-166144, paragraphs [0016] to [0107]; and the compounds described in JP-A-2003-344655, paragraphs [0022] to [0057]; and the like.

The addition amount of the retardation-causing agent according to the present invention is preferably 0.1 to 30 parts by mass, more preferably 0.5 to 20 parts by mass and still more preferably 1 to 15 parts by mass, with respect to 100 parts by mass of cellulose acylate.

In the present invention, as for the method of adding the retardation-causing agent, the retardation-causing agent may be added to a cellulose acylate solution (dope) after dissolving the Re-causing agent in an organic solvent such as alcohol, methylene chloride and dioxolan or may be directly added to the dope composition.

[Reverse Dispersion-Causing Agent]

The cellulose acylate film according to the present invention preferably contains an acyl-modified compound of the reduction product of a ketone compound-formaldehyde polymer and a reverse dispersion-causing agent in combination. The reverse dispersion-causing agent for use may be a so-called negative-intrinsic birefringence compound that expresses a slow axis in the direction substantially perpendicular to the stretching direction. In the present invention, the reverse dispersion-causing agent preferably has an absorption maximum in the wavelength region of 230 to 400 nm, more preferably in the wavelength region of 250 to 380 nm. The reverse dispersion-causing agent for use in the present invention is preferably an acrylic or vinyl polymer having aromatic rings on the side chains. For example, a polystyrene resin having an electron-donating group such as hydroxyl group on the aromatic ring can be used most favorably as the reverse dispersion-causing agent according to the present invention. The aromatic ring of the polystyrene resin is preferably an aryl group having 6 to 15 carbon atoms, more preferably a phenylene group, a naphthylene group or an anthracenylene group, and most preferably a phenylene group, from the viewpoint of compatibility with the cellulose acylate resin. The electron-donating group is preferably a hydroxyl group or an amino group, and a hydroxyl group is more preferable.

Polystyrene compounds favorably used as the reverse dispersion-causing agents for use in the present invention include but are not limited to the followings:

PHSC20A30S (trade name, manufactured by Toho Chemical Industry Co., Ltd.), mass-average molecular weight: 2000, absorption maximum wavelength: 279 nm, hydroxystyrene/styrene:70/30 (molar ratio), PHSC40A30S (trade name, manufactured by Toho Chemical Industry Co., Ltd.), mass-average molecular weight: 4000, absorption maximum wavelength: 279 nm, hydroxystyrene/styrene:70/30 (molar ratio), PHSC60A10S (trade name, manufactured by Toho Chemical Industry Co., Ltd.), mass-average molecular weight: 6000, absorption maximum wavelength: 279 nm, hydroxystyrene/styrene:90/10 (molar ratio), Maruka Lyncur M-SIP (trade name, manufactured by Maruzen Petrochemical), mass-average molecular weight: 1900, absorption maximum wavelength: 279 nm, pure hydroxystyrene, Maruka Lyncur M-S2P (trade name, manufactured by Maruzen Petrochemical), mass-average molecular weight: 5000, absorption maximum wavelength: 279 nm, pure hydroxystyrene, and PHSC100A15S (trade name, manufactured by Toho Chemical Industry), mass-average molecular weight: 10000, absorption maximum wavelength: 279 nm, hydroxystyrene/styrene:70/30 (molar ratio).

As for combination of the acyl-modified compound of the reduction product of a ketone compound-formaldehyde polymer and the reverse dispersion-causing agent, combination of an acyl-modified compound of the reduction product of a ketone compound-formaldehyde polymer at an acylation rate of 90% or more and a polystyrene compound having a hydroxystyrene/styrene copolymerization ratio of 50/50 to 100/0 is preferable for improvement well-balanced in retardation-expressing efficiency and reverse dispersibility. The content ratio of the acyl-modified compound of the reduction product of a ketone compound-formaldehyde polymer to the reverse dispersion-causing agent is preferably 5/95 to 95/5, more preferably 30/70 to 90/10, by mass.

[Plasticizer]

In the cellulose acylate film of the present invention, a plasticizer may be added so as to improve the mechanical properties or increase the drying speed. The plasticizer for use in the present invention is particularly preferably a monosaccharide or a derivative of a carbohydrate containing 2 to 10 monosaccharide units (hereinafter, referred to as polysaccharide or carbohydrate-based plasticizer).

The monosaccharide or polysaccharide constituting the carbohydrate-based plasticizer is characterized in that a substitutable group (for example, a hydroxyl group, a carboxyl group, an amino group or a mercapto group) in the molecule is substituted. Examples of the substituent include an ether group, an ester group, an amido group and an imido group.

Examples of the monosaccharide or carbohydrate containing from 2 to 10 monosaccharide units include erythrose, threose, ribose, arabinose, xylose, lyxose, allose, altrose, glucose, fructose, mannose, gulose, idose, galactose, talose, trehalose, isotrehalose, neotrehalose, trehalosamine, kojibiose, nigerose, maltose, maltitol, isomaltose, sophorose, laminaribiose, cellobiose, gentiobiose, lactose, lactosamine, lactitol, lactulose, melibiose, primeverose, rutinose, scillabiose, sucrose, sucralose, turanose, vicianose, cellotriose, chacotriose, gentianose, isomaltotriose, isopanose, maltotriose, manninotriose, melezitose, panose, planteose, raffinose, solatriose, umbelliferose, lycotetraose, maltotetraose, stachyose, maltopentaose, verbascose, maltohexaose, α-cyclodextrin, β-cyclodextrin, γ-cyclodextrin, δ-cyclodextrin, xylitol and sorbitol.

Among these, preferred are ribose, arabinose, xylose, lyxose, glucose, fructose, mannose, galactose, trehalose, maltose, cellobiose, lactose, sucrose, sucralose, α-cyclodextrin, β-cyclodextrin, γ-cyclodextrin, δ-cyclodextrin, xylitol and sorbitol, more preferred are arabinose, xylose, glucose, fructose, mannose, galactose, maltose, cellobiose, sucrose, β-cyclodextrin, γ-cyclodextrin, and particularly preferred are xylose, glucose, fructose, mannose, galactose, maltose, cellobiose, sucrose, xylitol and sorbitol.

Examples of the substituent of the carbohydrate-based plasticizer include an ether group (preferably an alkyl ether group having a carbon number of 1 to 22, more preferably from 1 to 12, still more preferably from 1 to 8, e.g., methyl ether group, ethyl ether group, propyl ether group, hydroxyethyl ether group, hydroxypropyl ether group, 2-cyanoethyl ether group), an ester group (preferably an acyl ester group having a carbon number of 1 to 22, more preferably from 2 to 12, still more preferably from 2 to 8, e.g., acetyl group, propionyl group, butyryl group, pentanoyl group, hexanoyl group, octanoyl group), an, amido group (preferably an amido having a carbon number of 1 to 22, more preferably from 2 to 12, still more preferably from 2 to 8, e.g., formamido group, actamido group), and an imido group (preferably an imido group having a carbon number of 4 to 22, more preferably from 4 to 12, still more preferably from 4 to 8, e.g., succinimido group). Among these, preferred are an ether group and an ester group, and more preferred is an ester group.

Preferred examples of the carbohydrate-based plasticizer include the followings, but the carbohydrate-based plasticizer which can be used in the present invention is not limited thereto.

That is, preferred examples include xylose tetraacetate, glucose pentaacetate, fructose pentaacetate, mannose pentaacetate, galactose pentaacetate, maltose octaacetate, cellobiose octaacetate, sucrose octaacetate, xylitol pentaacetate, sorbitol hexaacetate, xylose tetrapropionate, glucose pentapropionate, fructose pentapropionate, mannose pentapropionate, galactose pentapropionate, maltose octapropionate, cellobiose octapropionate, sucrose octapropionate, xylitol pentapropionate, sorbitol hexapropionate, xylose tetrabutyrate, glucose pentabutyrate, fructose pentabutyrate, mannose pentabutyrate, galactose pentabutyrate, maltose octabutyrate, cellobiose octabutyrate, sucrose octabutyrate, xylitol pentabutyrate, sorbitol hexabutyrate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, sorbitol hexabenzoate. Among these, more preferred are xylose tetraacetate, glucose pentaacetate, fructose pentaacetate, mannose pentaacetate, galactose pentaacetate, maltose octaacetate, cellobiose octaacetate, sucrose octaacetate, xylitol pentaacetate, sorbitol hexaacetate, xylose tetrapropionate, glucose pentapropionate, fructose pentapropionate, mannose pentapropionate, galactose pentapropionate, maltose octapropionate, cellobiose octapropionate, sucrose octapropionate, xylitol pentapropionate, sorbitol hexapropionate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, and sorbitol hexabenzoate. Among these, particularly preferred are maltose octaacetate, cellobiose octaacetate, sucrose octaacetate, xylose tetrapropionate, glucose pentapropionate, fructose pentapropionate, mannose pentapropionate, galactose pentapropionate, maltose octapropionate, cellobiose octapropionate, sucrose octapropionate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, and sorbitol hexabenzoate.

The carbohydrate-based plasticizer for use in the present invention is available as a commercial product (for example, available from Tokyo Kasei Kogyo Co., Ltd. or Aldrich) or may be synthesized by processing a commercially available carbohydrate into an ester derivative by a known method (for example, the method described in JP-A-8-245678). In the present invention, one kind of a carbohydrate-based plasticizer may be blended alone, or two or more kinds thereof may be used in combination. Also, the carbohydrate-based plasticizer may be used in combination with other plasticizers. Preferred examples of other plasticizers include alkylphthalyl alkyl glycolates, carboxylic acid esters and fatty acid esters of polyhydric alcohol.

The amount of the plasticizer added is preferably from 1 to 20 mass % based on the polymer resin. When the amount added is 1 mass % or more, the effect of accelerating the orientation of the liquid crystalline compound is easily obtained, and when the amount added is 20 mass % or less, bleed-out is scarcely caused. The amount added is more preferably from 2 to 15 mass %, and most preferably from 3 to 10 mass %.

[Fine Particle as a Matting Agent]

In the cellulose acylate film of the present invention, a fine particle is preferably added as a matting agent. Examples of the fine particle for use in the present invention include silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate and calcium phosphate. Among these, a fine particle containing silicon is preferred in view of giving low turbidity, and silicon dioxide is particularly preferred. The fine silicon dioxide particle is preferably a fine particle having an average primary particle diameter of 1 nm to 20 nm and an apparent specific gravity of 70 g/L or more. The average diameter of the primary particle is preferable in the range of 1 nm to 20 nm, and more preferable in the range of 5 nm to 16 nm because fine particles having such an average diameter can lower the haze of the film more effectively. The apparent specific gravity is preferably from 90 to 200 g/L or more, more preferably from 100 to 200 g/L or more. As the apparent specific gravity is larger, a liquid dispersion having a higher concentration can be prepared and this is preferred in view of improving both haze and aggregate.

Such fine particles usually form a secondary particle having an average particle diameter of 0.05 to 2.0 μm, and in the film, this fine particle is present as an aggregate of primary particles to form irregularities of 0.05 to 2.0 μm on the film surface. The average secondary particle diameter is preferably from 0.05 to 1.0 μm, more preferably from 0.1 to 0.7 μm, and most preferably from 0.1 to 0.4 μm. With respect to the primary and secondary particle diameters, particles in the film are observed through a scanning electron microscope, and the diameter of a circle circumscribing a particle is defined as the particle diameter. Further, 200 particles are observed by changing the site and the average value thereof is defined as the average particle diameter.

The fine silicon dioxide particle used may be a commercially available product such as Aerosil R972, R972V, R974, R812, 200, 200V, 300, R202, OX50 and TT600 (all produced by Nihon Aerosil Co., Ltd.), The fine zirconium oxide particle is commercially available under the trade name of, for example, Aerosil R976 or R811 (both produced by Nihon Aerosil Co., Ltd.), and these may be used.

Among these, Aerosol 200V and Aerosol R972V are preferred because these are a fine silicon dioxide particle having an average primary particle diameter of 20 nm or less and an apparent specific gravity of 70 g/L or more and provide a high effect of decreasing the coefficient of friction while maintaining low haze of the optical film.

The matting agent that can be used in the present invention is preferably prepared by the following method: A solvent and fine particles are mixed by stirring, to make a fine particle dispersion liquid, and the fine particle dispersion liquid is added to the first additive solution, which is separately provided, contains less than 5% by mass of cellulose acylate and has a molecular weight of 200 to 2,000, followed by being dissolved by stirring, and the second additive solution is added into the resultant mixture, followed by being dissolved by stirring, and then the resultant solution is mixed with the main cellulose acylate dope solution.

The surface of the matting agent has been hydrophobitized, and a hydrophobic additive tends to be adsorbed to the surface of the matting agent to form nuclei, to thereby cause nucleation of aggregates of the additive. It is thus preferable to add a relatively hydrophilic additive to a matting agent dispersion liquid, followed by adding a hydrophobic additive thereto, for suppressing the aggregation of the additive on the surface of the matting agent, decreasing the haze, and reducing light leakage during displaying black when incorporated into a liquid crystal display device.

It is preferable to use an in-line mixer for mixing a matting agent dispersant with an additive solution, and mixing the resultant mixture with a cellulose acylate solution. The present invention is not limited to these methods, but at the time of mixing and dispersing the fine silicon dioxide particle with a solvent or the like, the concentration of silicon dioxide is preferably from 5 to 30 mass %, more preferably from 10 to 25 mass %, and most preferably from 15 to 20 mass %. A higher dispersion concentration is preferred because the liquid turbidity to the same amount to be added becomes low and the haze and aggregate are improved. In the final dope solution of cellulose acylate, the amount of the matting agent fine particle added is preferably from 0.001 to 1.0 mass %, more preferably from 0.005 to 0.5 mass %, and most preferably from 0.01 to 0.1 mass %.

[Production of Cellulose Acylate Film]

The cellulose acylate film of the present invention is preferably produced by a solvent casting method. In the solvent casting method, the film is produced using a solution (dope) prepared by dissolving a cellulose acylate in an organic solvent.

The organic solvent preferably contains a solvent selected from an ether having a carbon number of 3 to 12, a ketone having a carbon number of 3 to 12, an ester having a carbon number of 3 to 12, and a halogenated hydrocarbon having a carbon number of 1 to 6. The ether, ketone and ester each may have a cyclic structure. A compound having any two or more functional groups of the ester, ketone and ether (that is, —O—, —CO— and —COO—) may also be used as the organic solvent. The organic solvent may have another functional group such as alcoholic hydroxyl group. In the case of an organic solvent having two or more kinds of functional groups, the number of carbon atoms is preferably within the preferred range specified above for the solvent having any one functional group.

Examples of the ethers having a carbon number of 3 to 12 include diisopropyl ether, dimethoxymethane, dimethoxyethane, 1,4-dioxane, 1,3-dioxolan, tetrahydrofuran, anisole and phenetol. Examples of the ketones having a carbon number of 3 to 12 include acetone, methyl ethyl ketone, diethyl ketone, diisobutyl ketone, cyclohexanone and methylcyclohexanone. Examples of the esters having a carbon number of 3 to 12 include ethyl formate, propyl formate, pentyl formate, methyl acetate, ethyl acetate and pentyl acetate.

Examples of the organic solvent having two or more kinds of functional groups include 2-ethoxyethyl acetate, 2-methoxyethanol and 2-butoxyethanol. The number of carbon atoms in the halogenated hydrocarbon is preferably 1 or 2, and most preferably 1. The halogen of the halogenated hydrocarbon is preferably chlorine. The proportion at which the hydrogen atom of the hydrogenated hydrocarbon is substituted by a halogen is preferably from 25 to 75 mol %, more preferably from 30 to 70 mol %, still more preferably from 35 to 65 mol %, and most preferably from 40 to 60 mol %. A representative halogenated hydro-carbon is methylene chloride.

As the organic solvent in the present invention, it is preferable to use a mixture of methylene chloride and an alcohol. The ratio of the alcohol to methylene chloride is preferably 1 mass % to 50 mass %, more preferably 10 mass % to 40 mass %, and most preferably 12 mass % to 30 mass %. As the alcohol, methanol, ethanol or n-butanol is preferable, and two or more of these alcohols may be mixed for combination use.

A cellulose acylate solution (dope) can be prepared by a general method of performing a treatment at a temperature of 0° C. or more (ordinary temperature or high temperature). The preparation of the cellulose acylate solution can be performed using a method and an apparatus for dope preparation in the general solvent casting method. In the case of a general method, a halogenated hydrocarbon (particularly, methylene chloride) is preferably used as the organic solvent.

The amount of the cellulose acylate in the cellulose acylate solution is adjusted to occupy from 10 to 40 mass % in the solution obtained. The amount of the cellulose acylate is preferably from 10 to 30 mass %. An arbitrary additive described later may be in advance added in the organic solvent (main solvent).

The cellulose acylate solution can be prepared by stirring a cellulose acylate and an organic solvent at an ordinary temperature (from 0 to 40° C.). A solution in a high concentration may be stirred under pressure in a heating condition. Specifically, a cellulose acylate and an organic solvent are charged into a pressure vessel and after sealing the vessel, the mixture is stirred under pressure while heating at a temperature in the range from a temperature not less than the boiling point of the solvent at ordinary temperature to a temperature not allowing for boiling of the solvent. The heating temperature is usually 40° C. or more, preferably from 60 to 200° C., more preferably from 80 to 110° C.

The components may be roughly mixed in advance and then charged into a vessel or may be successively charged into the vessel. The vessel needs to be constructed so that stirring can be performed. The vessel can be pressurized by injecting an inert gas such as nitrogen gas. Also, the rise in vapor pressure of the solvent due to heating may be utilized. Alternatively, the components may be added under pressure after sealing the vessel.

In the case of performing heating, the heating is preferably applied from outside of the vessel. For example, a jacket-type heating device may be used. Also, the entire vessel may be heated by providing a plate heater outside the vessel, laying a piping system and circulating a liquid.

The stirring is preferably performed using a stirring blade by providing the stirring blade inside the vessel. A stirring blade having a length long enough to reach near the wall of the vessel is preferred. The tip of the stirring blade is preferably equipped with a scraping blade for renewing the liquid film on the wall of the vessel.

The vessel may be equipped with measuring meters such as pressure gauge and thermometer. Each component is dissolved in a solvent inside of the vessel. The dope prepared is cooled and then taken out of the vessel, or the dope is taken out of the vessel and then cooled using a heat exchanger or the like.

The cellulose acylate solution can be also prepared by the cooling dissolution method. In the cooling dissolution method, cellulose acylate can be dissolved even in an organic solvent in which the cellulose acylate is hardly soluble by using a conventional dissolution method. Further, it is expected that a homogeneous solution can be rapidly obtained by the cooling dissolution method in the case of using a solvent in which cellulose acylate can be easily dissolved by a conventional dissolution method.

In the cooling dissolution method, cellulose acylate is first gradually added into an organic solvent under stirring at room temperature. It is preferable to control the amount of the cellulose acylate so as to give a concentration of 10 to 40% by mass in the mixture. It is more preferable that the content of the cellulose acylate is from 10 to 30% by mass. Further, arbitrary additive(s) described above may be in advance added to the mixture.

Next, the mixture is cooled to, for example, −100 to −10° C. (preferably −80 to −10° C., more preferably −0.50 to −20° C., and most preferably −50 to −30° C.). The cooling can be carried out in, for example, a dry ice/methanol bath (−75° C.) or a cooled diethylene glycol solution (−30 to −20° C.). Due to the cooling, the mixture of the cellulose acylate and the organic solvent can be solidified.

It is preferable that the cooling speed is 4° C./min or higher, more preferably 8° C./min or higher, and more preferably 12° C./min or higher. Although a higher cooling speed is more preferred, 10000° C./sec is the theoretical upper limit, 1000° C./sec is the technical upper limit, and 100° C./sec is the practical upper limit. The cooling speed is a value determined by dividing the difference between the initial cooling temperature and the final cooling temperature by the time period from the beginning of the cooling to the achievement of a final cooling temperature.

When the thus cooled mixture is heated to, for example, 0 to 200° C. (preferably 0 to 150° C., more preferably 0 to 120° C., and most preferably 0 to 50° C.), the cellulose acylate can be dissolved in the organic solvent. To rise the temperature, the mixture may be just allowed to stand at room temperature or heated in a warm bath.

The temperature rising speed is preferably 4° C./min or higher, more preferably 8° C./min or higher, and most preferably 12° C./min or higher. Although a higher temperature rising speed is more preferred, 10000° C./sec is the theoretical upper limit, 1000° C./sec is the technical upper limit, and 100° C./sec is the practical upper limit. The temperature rising speed is a value obtained by dividing the difference between the initial rising temperature and the final temperature rising temperature by the time period from the beginning of temperature rising to the achievement of the final rising temperature.

As explained above, a homogeneous cellulose acylate solution is obtained. In the case where dissolution still remains insufficient, the cooling and heating procedures may be repeated. Whether or not the dissolution is sufficient can be determined merely by observing the appearance of the solution with naked eye.

In the cooling dissolution method, it is preferable to use an airtight container to thereby avoid the invasion of moisture caused by dew condensation in the course of the cooling. By elevating pressure in the course of the cooling and reducing pressure in the course of heating, furthermore, the dissolution time can be shortened. To elevate and reduce the pressure, it is desirable to use a pressure-resistant container.

A cellulose acylate film is produced from the prepared cellulose acylate solution (dope) by a solvent casting method. A retardation causing is preferably added to the dope.

The dope is cast on a drum or a band, and the solvent is evaporated to form a film. The concentration of the dope before casting is preferably adjusted to have a solid content of 18 to 35%. The surface of the drum or band is preferably finished in a mirror state. The dope is preferably cast on a drum or band at a surface temperature of 10° C. or less.

The drying method in the solvent casting method is described in U.S. Pat. Nos. 2,336,310, 2,367,603, 2,492,078, 2,492,977, 2,492,978, 2,607,704, 2,739,069 and 2,739,070, British Patents 640,731 and 736,892, JP-B-45-4554 ("JP-B" means examined Japanese patent publication), JP-B-49-5614, JP-A-60-176834, JP-A-60-203430, and JP-A-62-115035. Drying on the band or drum can be performed by blowing air or an inert gas such as nitrogen.

The cellulose acylate film of the present invention is dried on a band or drum preferably at as low temperature as possible. When the content of the remaining solvent is 30% by mass or more, the drying temperature is preferably 150° C. or lower, more preferably 120° C. or lower, and most preferably 90° C. or lower. Formation of fine crystals in the film can be reduced, by drying at temperatures in the above-described range.

The cellulose acylate solution (dope) thus prepared, may be subjected to casting in a plural number of layers to form a film. In this case, it is preferred to form a cellulose acylate film by a solvent casting method. The dope is cast on a drum or a band and then the solvent is evaporated to form a film. Before the casting, it is preferable to control the concentration of the dope to thereby give a solid content of 10 to 40%. It is also preferable that the surface of the drum or the band has been specular-finished.

[Stretching Treatment]

The cellulose acylate film of the present invention is preferably obtained by performing a stretching treatment. As for the stretching direction of the film, the conveying direction (the longitudinal direction) and/or the vertical direction thereof (the width direction) are preferred.

The stretching method in the width direction is described, for example, in JP-A-62-115035, JP-A-4-152125, JP-A-4-284211, JP-A-4-298310 and JP-A-11-48271. In the case of stretching in the longitudinal direction, for example, the film can be stretched by adjusting the speed of the film conveying roller to make the film take-up speed higher than the film separation speed. In the case of stretching in the width direction, the film can be stretched also by conveying the film while keeping the film width by a tenter and gradually increasing the width of the tenter. The film may also be stretched using a stretching machine (preferably uniaxial stretching using a long stretching machine) after drying.

The cellulose acylate film of the present invention is preferably stretched at a constant stretching speed with the residual solvent content kept under a constant level. The residual solvent content at the beginning of stretching is generally 0 mass % to 80 mass %, preferably 0 mass % to 70% mass %, and more preferably 0 mass % to 60% mass %.

The stretching temperature is preferably in the range of 120 to 200° C. The film stretching rate is preferably 1 to 100%, more preferably 5 to 90%. In the present invention, the film stretching rate refers to the numerical value calculated according to the following formula (22).

{(Size after stretching/Size before stretching)−1}×100 (%)         Formula (22)

The ratio of (stretching rate in the width direction/stretching rate in the longitudinal direction) is preferably 1 to 10, more preferably 0.2 to 8.

[Properties of Cellulose Acylate Film]

<Film Thickness>

Under the recent trend toward reduction in thickness of liquid crystal display devices, the thickness of the cellulose acylate film according to the present invention is preferably 100 μm or less, more preferably 40 to 80 μm and still more preferably 40 to 70 μm. If the film thickness is less than 30 μm, transfer of the film during production of large-sized rolls can be instable, causing failures such as those by nicking and scratching more frequently.

[Retardation of Film]

In the present invention, $Re(\lambda)$ and $Rth(\lambda)$ indicate the in-plane retardation and the retardation in a thickness direction, respectively, at a wavelength of $\lambda$. $Re(\lambda)$ is measured by making light at a wavelength of $\lambda$ nm to be incident in the film normal direction in KOBRA 21ADH or WR (manufactured by Oji Scientific Instruments). The measurement wavelength ($\lambda$ nm) can be selected by manual exchange of wavelength selection filters or the retardation can be calculated from observed values by conversion, for example using a suitable program.

In the case where the film measured is a film expressed by a uniaxial or biaxial refractive index ellipsoid, the $Rth(\lambda)$ is calculated by the following method. The above-described $Re(\lambda)$ is measured at 6 points in total by making light at a wavelength of $\lambda$ nm to be incident from directions inclined with respect to the film normal direction in 10° steps up to 50° on one side from the normal direction with the in-plane slow axis (judged by KOBRA 21ADH or WR) being used as the inclination axis (rotation axis) (when the slow axis is not present, an arbitrary direction in the film plane is used as the rotation axis) and based on the retardation values measured, the assumed value of average refractive index and the film thickness value input, $Rth(\lambda)$ is calculated by KOBRA 21ADH or WR.

In the above, when the film has a direction where the retardation value becomes zero at a certain inclination angle from the normal direction with the rotation axis being the in-plane slow axis, the retardation value at an inclination angle larger than that inclination angle is calculated by KOBRA 21ADH or WR after converting its sign into a negative sign.

Incidentally, after measuring the retardation values from two arbitrary inclined directions by using the slow axis as the inclination axis (rotation axis) (when the slow axis is not present, an arbitrary direction in the film plane is used as the rotation axis), based on the values obtained, the assumed value of average refractive index and the film thickness value input, Rth can also be calculated according to the following formulae (A) and (B).

$$Re(\theta) = \left[ nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)}$$
       Formula (A)

Note:

In formula (A), $Re(\theta)$ represents the retardation value in the direction inclined at an angle of $\theta$ from the normal direction, nx represents the refractive index in the in-plane slow axis direction, ny represents the refractive index in the direction crossing with nx at right angles in the plane, nz represents the refractive index in the direction crossing with nx and ny at right angles, and d represents the film thickness.

$$Rth = ((nx+ny)/2 - nz) \times d$$        Formula (B)

In the case where the film measured is a film incapable of being expressed by a uniaxial or biaxial refractive index ellipsoid or a film not having a so-called optic axis, $Rth(\lambda)$ is calculated by the following method.

The $Re(\lambda)$ is measured at 11 points by making light at a wavelength of $\lambda$ nm to be incident from directions inclined with respect to the film normal direction in 10° steps from −50° to +50° with the in-plane slow axis (judged by KOBRA 21ADH or WR) being used as the inclination axis (rotation axis) and based on the retardation values measured, the assumed value of average refractive index and the film thickness value input, $Rth(\lambda)$ is calculated by KOBRA 21ADH or WR.

In the measurement above, as for the assumed value of average refractive index, those described in Polymer Handbook (John Wiley & Sons, Inc.) and catalogues of various optical films can be used. The average refractive index of which value is unknown can be measured by an Abbe refractometer. The values of average refractive index of main optical films are as follows: cellulose acylate (1.48), cycloolefin polymer (1.52), polycarbonate (1.59), polymethyl methacrylate (1.49) and polystyrene (1.59). When such an assumed value of average refractive index and the film thickness are input, KOBRA 21ADH or WR calculates nx, ny and nz and from these calculated nx, ny and nz, $Nz=(nx-nz)/(nx-ny)$ is further calculated.

In the present invention, the reverse dispersibility of retardation wavelength dispersion means increase in the value of retardation associated with increase in measurement wavelength.

Preferably, Re and Rth of the cellulose acylate film according to the present invention at a measurement wavelength of 548 nm satisfy the relationships represented by following formulae (1) and (2) and the film shows greater reverse dispersibility, as the measurement wavelength is increased.

30 nm ≤ $Re(548)$ ≤ 150 nm        formula (1)

70 nm ≤ $Rth(548)$ ≤ 300 nm        formula (2)

Further, it is preferable to satisfy the following formulae (3) and (4), $$0.7 \leq Re(446)/Re(548) < 1.00 \quad \text{formula (3)}$$

$$0.7 \leq Rth(446)/Rth(548) < 1.00 \quad \text{formula (4)}$$

Formula (1) is preferably the following formula (1-b), and most preferably the following formula (1-c).

$$30 \text{ nm} \leq Re(548) \leq 100 \text{ nm} \quad \text{formula (1-b)}$$

$$35 \text{ nm} \leq Re(548) \leq 80 \text{ nm} \quad \text{formula (1-c)}$$

Formula (2) is preferably the following formula (2-b), and most preferably the following formula (2-c).

$$90 \text{ nm} \leq Rth(548) \leq 300 \text{ nm} \quad \text{formula (2-b)}$$

$$100 \text{ nm} \leq Rth(548) \leq 270 \text{ nm} \quad \text{formula (2-c)}$$

Formula (3) is preferably the following formula (3-b), and most preferably the following formula (3-c).

$$0.70 \leq Re(446)/Re(548) < 0.97 \quad \text{formula (3-b)}$$

$$0.75 \leq Re(446)/Re(548) < 0.95 \quad \text{formula (3-c)}$$

Formula (4) is preferably the following formula (4-b), and most preferably the following formula (4-c).

$$0.7 \leq Rth(446)/Rth(548) \leq 0.97 \quad \text{formula (4-b)}$$

$$0.75 \leq Rth(446)/Rth(548) \leq 0.95 \quad \text{formula (4-c)}$$

It is possible, by adjusting the retardation in the range above, to obtain a liquid crystal display device smaller in the tint change due to viewing angle when installed in a liquid crystal display device, as an optical compensation sheet member.

Favorably, it is possible to obtain a cellulose acylate film high in reverse dispersibility, low in haze and low in moisture permeability by using a cellulose acylate having particular substituent groups and a particular substitution degree and a particular acyl-modified compound of the reduction product of a ketone compound-formaldehyde polymer in combination. More favorably, the cellulose acylate film according to the present invention contains a cellulose acylate having an acyl substitution degree of 2.0 to 2.97 and an acyl-modified compound of the reduction product of a ketone compound-formaldehyde polymer having a molar absorption coefficient of 2000 or less in the wavelength range of 230 to 700 nm; Re and Rth of the film at a measurement wavelength of 550 nm satisfy the relationships represented by Formulae (1) and (2) above; and Re and Rth thereof both show reverse dispersibility when the measurement wavelength is increased.

It is possible to obtain a film satisfying Formulae (1) and (2), for example, by choosing a cellulose acylate material properly, adjusting the addition amounts of the acyl-modified compound of the reduction product of a ketone compound-formaldehyde polymer and/or the retardation-causing agent, or adjusting the stretching condition. Specific examples will be described in detail in Examples below.

<Haze>

The haze of the cellulose acylate film of the present invention is preferably from 0.1 to 0.8, more preferably from 0.1 to 0.7, and most preferably from 0.1 to 0.6. The haze can be measured using any haze meter ordinarily used in the related field, For example, a haze meter ("1001DP", product of Nippon Denshoku Industries) can be used for its measurement, In the invention, the haze measured using a haze meter ("HGM-2DP", trade name; product of Suga Test Instruments) according to JIS K6714 was used. By controlling the haze within the above-described range, the resulting film can provide a high contrast image when it is incorporated as a polarizing plate protective film in a liquid crystal display device.

<Moisture Permeability>

The moisture permeability of the cellulose acylate film according to the present invention is preferably 1000 to 2500 g/m²·24 h or less under an environment of 60° C. and 95% RH. It is more preferably 1000 to 2200 g/m²·24 h and particularly preferably 1000 to 2000 g/m²·24 h. if the moisture permeability is more than 2500 g/m²·24 h, polarization performance of the polarizer may drastically deteriorated over time. On the other hand, if the moisture permeability of the cellulose acylate film is less than 1000 g/m²·24 h, drying of an adhesive by the cellulose acylate film may be inhibited when a polarizing plate is prepared by bonding the cellulose acrylate film onto both faces of a polarizing film with the adhesive, thus causing adhesion defects.

The moisture permeability can be determined in a measuring device satisfying the requirements specified in JIS Z-0208. Specifically, it is possible to calculate the moisture transmissivity (g/m²/24 h) per unit area, by measuring the increase in the entire weight of a container when about 10 g of calcium chloride is placed therein and the container is sealed with the film and left under an container external environment at 60° C. and 95% RH for 24 hours (weight increase=weight after moisturization-weight before moisturization) and dividing the weight increase by the area of the opening.

[Polarizing Plate]

The polarizing plate according to the present invention is a polarizing plate having a polarizing film and two transparent protective films formed on both surfaces thereof, wherein at least one transparent protective film is the cellulose acylate film according to the present invention. The cellulose acylate film of the present invention may be imparted with adherence to a polarizer material such as polyvinyl alcohol by applying an alkali saponification treatment thereto and can be used as a polarizing plate protective film. The saponification method is described in, for example, [0211] and [0212] of JP-A-2007-86748, and the production method for the polarizer of the polarizing plate and optical characteristics and the like of the polarizing plate are described in [0213] to [0255] of the same patent publication. Based on these descriptions, a polarizing plate using the film of the present invention as a protective film can be produced.

The cellulose acylate film of the present invention is preferably laminated to a polarizer so that the transmission axis of the polarizer and the slow axis of the cellulose acylate film can run substantially in parallel. In the liquid crystal display device of the present invention, it is preferred that the transmission axis of a first polarizing plate and the slow axis of a first retardation film are substantially in parallel and the transmission axis of a second polarizing plate and the slow axis of a second retardation film are substantially in parallel. The term "substantially in parallel" as used herein indicates that the slippage between the main refractive index nx direction of the first retardation film or the second retardation film for use in the present invention and the transmission axis direction of the polarizing plate is within 1°. The slippage is within 1°, more preferably within 0.50°. If the slippage exceeds 1°, the performance in terms of the polarization degree of the polarizing plate in a cross-Nicol state decreases to cause light-through and this is not preferred.

The single plate transmittance TT, parallel transmittance PT and cross transmittance CT of the polarizing plate are measured using UV3100PC (manufactured by Shimadzu Corporation). The measurement is performed in the range of 380 to 780 nm, and an average of 10 measurements is used for all of single plate transmittance, parallel transmittance and cross transmittance. The endurance test of the polarizing plate is performed as follows in two modes, that is, (1) a polarizing plate alone and (2) a polarizing plate laminated to glass through a pressure-sensitive adhesive.

(1) In the measurement of a polarizing plate alone, polarizing plates are combined such that the optically compensatory film is sandwiched between two polarizers, and two samples having the same crossing are prepared and measured.

(2) For the glass lamination mode, the polarizing plate is laminated on glass such that the optically compensatory film comes to the glass side, and two samples (about 5 cm×5 cm) are prepared. The single plate transmittance is measured by arranging the film side of this sample to face the light source. Two samples are measured, and the average of the obtained values is defined as the single plate transmittance.

As regards the favorable range of the polarization performance, the single plate transmittance TT, the parallel transmittance PT and the cross transmittance CT are, in this order, preferably 40.0≤TT≤45.0, 30.0≤PT≤40.0 and CT≤2.0, more preferably 41.0≤TT≤44.5, 34≤PT≤39.0 and CT≤1.3 (units all are %). In the endurance test of the polarizing plate, the variation is preferably smaller. In the polarizing plate of the present invention, when the polarizing plate is left standing at 60° C. and 95% RH for 500 hours, the variation ΔCT (%) of the single plate cross transmittance and the variation ΔP of the polarization degree preferably satisfy at least one of the following formulae (j) and (k):

$$-6.0 \leq \Delta CT \leq 6.0 \quad (j)$$

$$10.0 \leq \Delta P \leq 0.0 \quad (k)$$

Here, the variation indicates a value obtained by subtracting the measured value before the test from the measured value after the test. By satisfying the above requirements, the stability during use or storage of the polarizing plate can be ensured.

[Functionalization of Polarizing Plate]

The polarizing plate of the present invention may also be preferably used as a functionalized polarizing plate by combining it with an antireflection film or brightness enhancing film for enhancing the visibility of a display or with an optical film having a functional layer such as hardcoat layer, forward scattering layer and antiglare layer. Anti-reflection films, brightness-improving films, other functional optical films, hardcoat layers, forward scattering layers, and antiglare layers for functionalization are described, for example, in JP-A-2007-86748, paragraphs [0257] to [0276], and it is possible to produce a functionalized polarizing plate with reference to the description.

[Liquid Crystal Display Device]

The liquid crystal display device of the present invention is a liquid crystal display device comprising a liquid crystal cell and two polarizing plates disposed on both sides of the liquid crystal cell, wherein at least one of the polarizing plates is the polarizing plate of the present invention. The polarizing plate in which the cellulose acylate film of the present invention is used can particularly be used advantageously in a liquid crystal display device. The polarizing plate of the present invention may be used in liquid crystal cells driven in various display modes. As the display mode of the liquid crystal cell, various display modes such as a TN (twisted nematic) mode, an IPS (in-plane switching) mode, an FLC (ferroelectric liquid crystal) mode, an AFLC (anti-ferroelectric liquid crystal) mode, an OCB (optically compensatory bend) mode, an STN (super twisted nematic) mode, a VA (vertically aligned) mode and an HAN (hybrid aligned nematic) mode are proposed. Among these, the polarizing plate of the present invention can be preferably applied to OCB-mode or VA-mode; particularly preferably applied to VA-mode.

An OCB mode liquid crystal cell is a liquid crystal display device using a bend alignment mode crystal cell in which rod-shaped liquid crystalline molecules in the upper parts of the liquid crystal cell are aligned in a direction substantially opposite (symmetrically) to those in the lower parts of the liquid crystal cell. The OCB mode liquid crystal cell is disclosed in U.S. Pat. Nos. 4,583,825 and 5,410,422. Since the rod-shaped liquid crystalline molecules are aligned symmetrically between the upper part and lower part of the liquid crystal cell, the bend alignment-mode liquid crystal cell has a self-compensatory function, This liquid crystal mode is therefore called also "OCB (Optically Compensatory Bend)" liquid crystal mode, The bend alignment-mode liquid crystal display device has an advantage of a high response speed.

In the VA mode liquid crystal cell, rod-shaped liquid crystal molecules are aligned substantially vertically when no voltage is applied thereto.

The VA mode liquid crystal cell includes (1) a VA mode liquid crystal cell in the narrow sense in which rod-shaped liquid crystal molecules are aligned substantially vertically when no voltage is applied thereto and are aligned substantially horizontally when a voltage is applied thereto (for example, described in JP-A-2-176625), (2) an (MVA mode) liquid crystal cell in which the VA mode is modified into multi-domain mode so as to widen the viewing angle (for example, described in SID97, Digest of tech. Papers (Abstracts), 28 (1997), p. 845), (3) an (n-ASM mode) liquid crystal cell in which rod-like liquid crystal molecules are aligned substantially vertically when no voltage is applied thereto and oriented in twisted multi-domain alignment when a voltage is applied thereto (for, example, described in Abstracts of Japanese Forum of Liquid Crystal, 58 to 59 (1998), and (4) a SURVAIVAL mode liquid crystal cell (for example, announced at LCD International 98). In liquid crystal display devices driven in an OCB mode or VA mode, a liquid crystal cell may be disposed and two polarizing plates may be disposed on both sides of the liquid crystal cell. In the VA mode, the polarizing plate may be disposed in the back light side of the cell. The liquid crystal cell supports a liquid crystal between two electrode substrates.

Hereinafter, the liquid crystal display device according to the present invention will be described with reference to the drawings. FIG. 1 is a pattern diagram illustrating an example of a display mode of a liquid crystal display device according to the present invention, and FIG. 2 is a schematic view illustrating another example of the liquid crystal display device according to the present invention.

The liquid crystal display device shown in FIG. 1 has a VA-mode liquid crystal cell (31) and a top polarizing plate (30) bonded to one surface thereof and a bottom polarizing plate (32) bonded to the other surface. The polarizing plates (30) and (32) are prepared by bonding a cellulose acylate film (33) respectively to both sides of the polarizing film (34).

Figure 2:
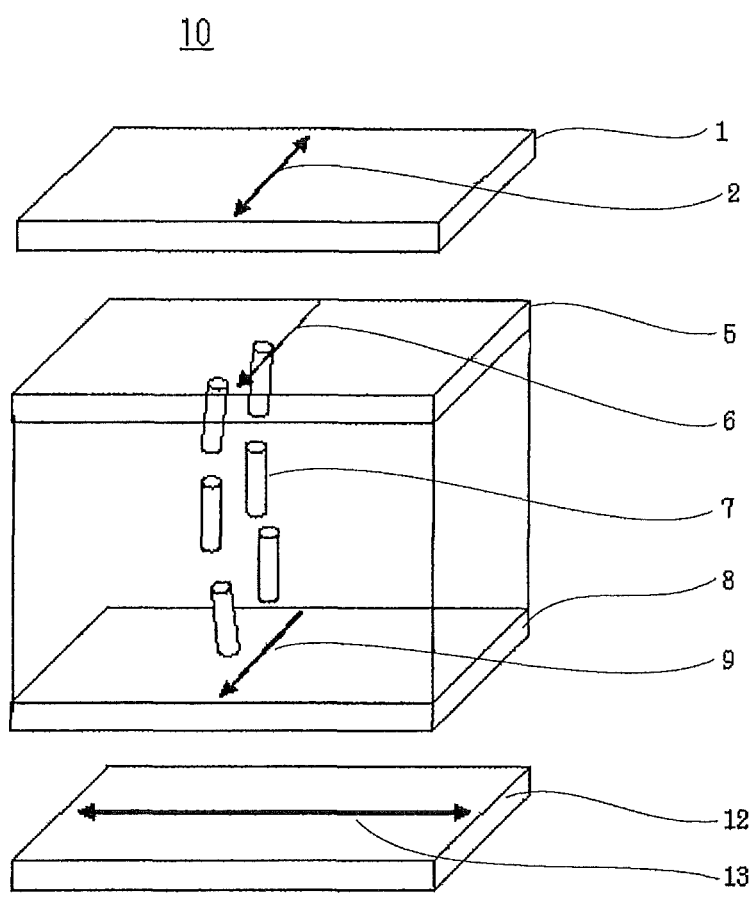
FIG. 2 is a schematic perspective view illustrating another example of the liquid crystal display device according to the present invention.

The liquid crystal display device (10) shown in FIG. 2 has a liquid crystal cell having a liquid crystal layer (7), a LC cell-top electrode substrate (5) and a LC cell-bottom electrode substrate (8) bonded to both surfaces thereof, and additionally a top polarizing plate (1) and a bottom polarizing plate (12) bonded to both surfaces of the liquid crystal cell. The direction of the absorption axis of the top polarizing plate (2), the direction of the orientation control of the top substrate (6), the direction of the orientation control of the bottom substrate (9), and the direction of the absorption axis of the bottom polarizing plate (13) are respectively the directions shown in FIG. 2.

According to the present invention, it is possible to provide a cellulose acylate film higher in reverse dispersibility and lower in moisture permeability and haze that suppresses deterioration in display performance of liquid crystal display devices under high-temperature and high-humidity environment when used as a polarizing plate-protective film, a polarizing plate having the film as transparent protective film, and a liquid crystal display device having the polarizing plate.

The present invention can provide a cellulose acylate film higher in reverse dispersibility and lower in moisture permeability and haze that suppresses deterioration in display performance of liquid crystal display devices under high-temperature and high-humidity environment when used as a polarizing plate-protective film, a polarizing plate having the film as transparent protective film, and a liquid crystal display device having the polarizing plate higher in contrast and smaller in tint change due to viewing angle.

The present invention will be described in more detail based on the following examples. Any materials, reagents, amount and ratio of use and operations, as shown in the examples, may appropriately be modified without departing from the spirit and scope of the present invention. It is therefore understood that the present invention is by no means intended to be limited to the specific examples below.

EXAMPLES

Synthesis Example 1

Synthesis of Acyl-Modified Compound B of Reduction Product of a Ketone Compound-Formaldehyde Polymer 80 g of a commercially available acetophenone-formaldehyde polymer reduction product (number average molecular weight: 800) used as the reduction product of a ketone compound-formaldehyde polymer and 400 mL of pyridine were mixed, and 78.5 g (1.00 mole) of acetyl chloride was added dropwise thereto, while the mixture was cooled on ice. After dropwise addition, the mixture was stirred at 35° C. for 5 hours; the reaction solution was then poured into 500 mL of 1 N hydrochloric acid; and the organic layer was extracted with 300 mL of ethyl acetate. The extract was then dried on anhydrous sodium sulfate; ethyl acetate was removed by distillation under reduced pressure; the residue obtained was purified by silica gel chromatography (eluate: n-hexane/ethyl acetate=3/7 (by volume)), to give acyl-modified compound B of reduction product of a ketone compound-formaldehyde polymer (designated as acetyl-modified polymer compound B in Tables 1 and 2) (yield: 120 g).

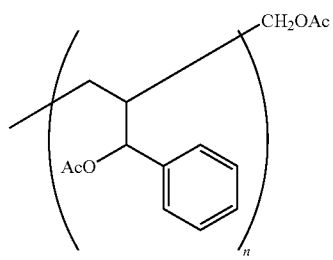

(Ac represents an acetyl group.)

Synthesis Example 2

Synthesis of Acyl-Modified Compounds C to H of Reduction Products of a Ketone Compound-Formaldehyde Polymer The Synthesis Example 1 was repeated, while reduction products of a ketone compound-formaldehyde polymer different in number average molecular weight were used as the starting materials and acetyl chloride, propionyl chloride, and butyryl chloride were used as the acylating agents, to give various acyl-modified compounds C to F of reduction product of a ketone compound-formaldehyde polymer (designated as acetyl-modified polymer compounds C to D, propionyl-modified polymer compound E and butyryl-modified polymer compound F in Tables 1 and 2). In addition, acyl-modified compounds G to H of the reduction product of an acetophenone-formaldehyde polymer different in acetylation degree (designated as acetyl-modified polymer compounds G to H in Tables 1 and 2) were obtained, while the amount of acetyl chloride added was adjusted.

TABLE 1

| Kind | Number average molecular weight | Kind of acyl group | Acyl substitution degree (%) |
|---|---|---|---|
| acetyl-modified polymer compound B | 600 | acetyl | 99 |
| acetyl-modified polymer compound C | 1200 | acetyl | 99 |
| acetyl-modified polymer compound D | 2000 | acetyl | 99 |
| propionyl-modified polymer compound E | 600 | propionyl | 99 |
| butyryl-modified polymer compound F | 600 | butyryl | 99 |
| acetyl-modified polymer compound G | 600 | acetyl | 77 |
| acetyl-modified polymer compound H | 600 | acetyl | 58 |

Example 1

Production of Cellulose Acylate Film 1

(Preparation of Cellulose Acylate Solution 101)

Cellulose acylate solution 101 was prepared by charging the following composition into a mixing tank and stirring it to dissolve respective components.

(Composition of Cellulose Acylate Solution 101)

| | |
|---|---|
| Cellulose acetate (acetyl substitution degree of 2.75 and a polymerization degree of 380 | 100.0 parts by mass |
| acyl-modified compound B of reduction product of a ketone compound-formaldehyde polymer | 10.0 parts by mass |
| Methylene chloride (first solvent) | 402.0 parts by mass |
| Methanol (second solvent) | 60.0 parts by mass |

(Preparation of Matting Agent Solution 102)

Matting Agent Solution 102 was prepared by charging the following composition into a dispersing machine and stirring it to dissolve respective components.

(Composition of Matting Agent Solution 102)

| | |
|---|---|
| Silica particle having an average particle size of 20 nm (AEROSIL R972, produced by Nippon Aerosil Co., Ltd.) | 2.0 parts by mass |
| Methylene chloride (first solvent) | 75.0 parts by mass |
| Methanol (second solvent) | 12.7 parts by mass |
| Cellulose acylate solution 101 | 10.3 parts by mass |

(Preparation of Retardation Causing Solution 103)

Retardation causing solution 103 was prepared by charging the following composition into a mixing tank and stirring it under heating to dissolve respective components.

(Composition of Retardation Causing Solution 103)

| | |
|---|---|
| Retardation causing solution 103 | 20.0 parts by mass |
| Methylene chloride (first solvent) | 67.2 parts by mass |
| Methanol (second solvent) | 10.0 parts by mass |
| Cellulose acylate solution 101 | 12.8 parts by mass |

[retardation-causing agent A]

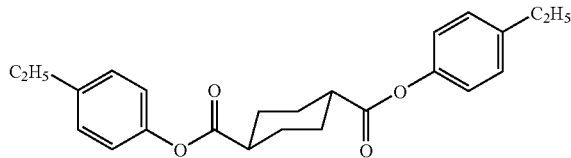 [SMILES: CCc1ccc(OC(=O)C2CCC(C(=O)Oc3ccc(CC)cc3)CC2)cc1]

1.3 Parts by mass of Matting Agent Solution 102 and 8.7 parts by mass of Retardation causing solution 103 were mixed using an in-line mixer after filtering each solution, 90.0 parts by mass of Cellulose acylate solution 101 was further added and mixed using an in-line mixer, the mixture was then cast using a band casting machine, and the film was dried at 100° C. until reaching a residual solvent content of 40% and then stripped off. The film having a residual solvent content of 20% was transversely stretched at a stretch ratio of 40% by using a tenter at an ambient temperature of 150° C. and further kept at 130° C. for 3 minutes. After removing the clips, the film was dried at 130° C. for 30 minutes to produce cellulose acylate film 101. The produced cellulose acylate film 101 had a residual solvent amount of 0.1% and a thickness of 70 μm.

Examples 2 to 10

Preparation of Cellulose Acylate Films 2 to 10

Cellulose acylate films 2 to 10 were prepared in a manner similar to Example 1, except that the substitution degree of the cellulose acylate, the kind and amount of the additives and the film thickness were changed to those shown in Table 1.

Comparative Examples 1 to 3

Preparation of Cellulose Acylate Films 11 to 13

Cellulose acylate films 11 to 13 were produced in the same manner except that in Example 1, the substitution degree of the cellulose acetate and the kind and amount of the additives and the film thickness were changed as shown in Table 1.

TABLE 2

| Film No. | Substitution degree of cellulose acylate | | | Hydrophobizing agent | | Retardation-causing agent | | Stretching rate (%) | Film thickness (μm) | Remarks |
|---|---|---|---|---|---|---|---|---|---|---|
| | acetyl | propionyl | total | Kind | Addition amount* | Kind | Addition amount* | | | |
| 1 | 2.85 | 0.00 | 2.85 | acetyl-modified polymer compound B | 10 | A | 4.0 | 40 | 70 | Present invention |
| 2 | 2.65 | 0.00 | 2.65 | acetyl-modified polymer compound B | 15 | A | 1.0 | 30 | 65 | Present invention |
| 3 | 2.44 | 0.00 | 2.44 | acetyl-modified polymer compound B | 20 | none | none | 30 | 50 | Present invention |
| 4 | 1.56 | 0.80 | 2.36 | acetyl-modified polymer compound B | 8 | none | none | 40 | 65 | Present invention |
| 5 | 2.85 | 0.00 | 2.85 | acetyl-modified polymer compound C | 10 | A | 4.0 | 40 | 70 | Present invention |
| 6 | 2.85 | 0.00 | 2.85 | acetyl-modified polymer compound D | 10 | A | 4.0 | 40 | 70 | Present invention |
| 7 | 2.85 | 0.00 | 2.85 | propionyl-modified polymer compound E | 10 | A | 4.0 | 40 | 70 | Present invention |
| 8 | 2.85 | 0.00 | 2.85 | butyryl-modified polymer compound F | 10 | A | 4.0 | 40 | 70 | Present invention |
| 9 | 2.85 | 0.00 | 2.85 | acetyl-modified polymer compound G | 10 | A | 4.0 | 40 | 70 | Present invention |
| 10 | 2.85 | 0.00 | 2.85 | acetyl-modified polymer compound H | 10 | A | 4.0 | 40 | 70 | Present invention |
| 11 | 2.44 | 0.00 | 2.44 | none | none | none | none | 30 | 45 | Comparative example |
| 12 | 2.44 | 0.00 | 2.44 | Compound I | 20 | none | none | 30 | 50 | Comparative example |

TABLE 2-continued

| Film No. | Substitution degree of cellulose acylate | | | Hydrophobizing agent | | Retardation-causing agent | | Stretching rate (%) | Film thickness (μm) | Remarks |
|---|---|---|---|---|---|---|---|---|---|---|
| | acetyl | propionyl | total | Kind | Addition amount* | Kind | Addition amount* | | | |
| 13 | 2.44 | 0.00 | 2.44 | Compound J | 20 | none | none | 30 | 50 | Comparative example |

*Parts by mass with respect to 100 parts by mass of cellulose acylate

Compound I (exemplified compound in JP-A-2003-183417)

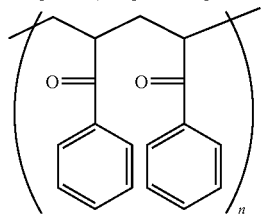

number average molecular weight 1200

Compound J (exemplified compound in JP-A-2003-183417)

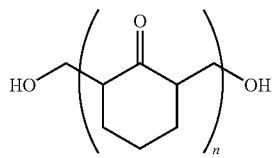

number average molecular weight 600

[Measurement of Retardation]

The Re retardation and the Rth retardation of each cellulose acetate film prepared at wavelengths 446 nm, 548 nm and 629 nm under an environment at 25° C. and a relative humidity of 60% were measured by using KOBRA WR (trade name, manufactured by Oji Scientific Instruments Co., Ltd.). In addition, the Re retardation and Rth retardation thereof at a wavelength of 548 nm under an environment at 25° C. and a relative humidity of 10% and also under an environment of 25° C. and a relative humidity of 80% were measured.

[Measurement of Haze]

The haze of a film sample of 40 mm×80 mm in size was measured according to the method of JIS K-6714 at 25° C. and 60% RH, by using a hazemeter (HGM-2DP, trade name, Suga Test Instrument Co., Ltd.).

[Moisture Permeability]

The moisture permeability was measured by using a measuring device satisfying the requirements specified in JIS Z-0208 (cup method). Approximately 10 g of calcium chloride was placed in a container, and increase in the entire weight of the container was measured, after it is left under an external environment at 60° C. and 95% RH for 24 hours. (Weight increase=weight after moisturization−weight before moisturization). In addition, the moisture transmissivity per unit area (g/m$^2$/24 h) was calculated by dividing the weight increase by the area of the opening. Here, the diameter of the film sample used was 70 mmφ, and that of the opening of the measurement container was 60 mmφ. These results are summarized in Table 3.

TABLE 3

| Film No. | Re(548) (nm) | Re(629)/Re(446) (nm) | Rth(548) (nm) | Rth(629)/Rth(446) (nm) | Haze | Moisture permeability (g/m$^2$ · 24 hr) | Remarks |
|---|---|---|---|---|---|---|---|
| 1 | 35 | 0.94 | 133 | 0.95 | 0.6 | 1400 | Present invention |
| 2 | 52 | 0.94 | 125 | 0.94 | 0.7 | 1900 | Present invention |
| 3 | 44 | 0.93 | 115 | 0.94 | 0.6 | 2400 | Present invention |
| 4 | 57 | 0.93 | 134 | 0.93 | 0.5 | 2300 | Present invention |
| 5 | 38 | 0.93 | 137 | 0.95 | 0.7 | 1400 | Present invention |
| 6 | 40 | 0.95 | 138 | 0.95 | 1.2 | 2400 | Present invention |
| 7 | 34 | 0.94 | 135 | 0.95 | 0.8 | 1500 | Present invention |
| 8 | 33 | 0.94 | 132 | 0.94 | 0.9 | 1400 | Present invention |
| 9 | 38 | 0.94 | 121 | 0.95 | 0.6 | 1600 | Present invention |
| 10 | 42 | 0.95 | 116 | 0.94 | 0.5 | 1900 | Present invention |
| 11 | 35 | 0.87 | 125 | 0.91 | 0.3 | 3500 | Comparative example |
| 12 | 48 | 1.03 | 109 | 0.96 | 1 | 2500 | Comparative example |
| 13 | 44 | 0.93 | 113 | 0.93 | 0.7 | 3000 | Comparative example |

The results in Table 3 show that films 1 to 10 obtained by using the acyl-modified compound of the reduction product of a ketone compound-formaldehyde polymer according to the present invention have favorably a moisture permeability lower than that of the films 11 and 12 of Comparative Examples not containing the compound added. The results also show that the film 12 of Comparative Example has forward dispersibility, while films 1 to 10 obtained by using the acyl-modified compound of the reduction product of a ketone compound-formaldehyde polymer according to the present invention favorably have reverse dispersibility.

Example 11

Preparation of Polarizing Plate 1

[Saponification Treatment of Cellulose Acylate Film]

The cellulose acylate film 1 prepared in Example 1 was immersed in 1.3 mol/L aqueous sodium hydroxide solution at 55° C. for 2 minutes, then washed in a washing-water bath at room temperature, neutralized with 0.05 mol/L sulfuric acid at 30° C., washed again in a washing-water bath at room temperature, and then, dried in hot air at 100° C. The cellulose acylate film 101 was saponified in this way on its surface and supplied for the following preparation of a polarizing plate sample.

Separately, a commercially available cellulose triacetate film (Fujitac TD80UF, trade name, manufactured by Fuji Photo Film Co., Ltd.) was saponified under the same condition and supplied for the following preparation of a polarizing plate sample.

[Production of Polarizing Film]

A polarizing film was prepared by adsorption of iodine on a stretched polyvinylalcohol film, and an optical compensation sheet of the saponified cellulose acylate film 1 above was bonded to one face of the polarizing film as transparent protective film by using a polyvinylalcohol-based adhesive. The transmission axis of the polarizer and the slow axis of the cellulose acylate film were placed in parallel.

In addition, the cellulose triacetate film saponified above was bonded to the rear face of the polarizing film by using the polyvinylalcohol-based adhesive, to give a polarizing plate 1. Thus, polarizing plate 1 was produced.

Example 12

Preparation of Polarizing Plates 2 to 10

With respect to the cellulose acylate films 2 to 10, polarizing plates 2 to 10 were also prepared in the same manner as polarizing plate 1.

Comparative Example 4

Preparation of Polarizing Plates 11 to 13

With respect to the cellulose acylate films 11 to 13, polarizing plates 11 to 13 were also prepared in the same manner as polarizing plate 1.

Example 13

Production of VA-mode Liquid Crystal Display Device and Evaluation Thereof 1

[Production of Liquid Crystal Cell]

One part by mass of octadecyldimethylammonium chloride (coupling agent) was added to 100 parts by mass of 3 mass % aqueous polyvinylalcohol solution. The mixture was spin-coated on a glass plate having ITO electrodes thereon, heat-treated at 160° C., and rubbed, to give a vertically oriented film. The rubbing treatment was carried out in opposite directions on two glass plates. The two glass plates were placed at positions facing each other at a cell gap (d) adjusted to 5 μm, A liquid crystal compound containing ester- and ethane-based compounds as the principal components (Δn: 0.08) was injected into the cell gap, to give a vertically-orientated liquid crystal cell. The product of Δn and d was 410 nm.

The polarizing plate 1 was bonded to both faces of the vertically-orientated liquid crystal cell produced above, by using an adhesive sheet, to give a liquid crystal display device 1.

The polarizing plates 2 to 10 of the present invention and the polarizing plates 11 to 13 of Comparative Examples were also prepared in a manner similar to the liquid crystal display device 1, to give respectively liquid crystal display devices 2 to 10 and 11 to 13.

[Change of Color Due to Viewing Angle]

The change in color at a polar angle of 60° between the colors seen at azimuthal angles of 0° and 80° of each of the liquid crystal display devices 1 to 10 and 11 to 13 thus prepared was determined by using Ezcontrast (trade name, manufactured by ELDIM), and the front-face contrast Δx and the absolute value of a color change on the xy chromaticity diagram Δy were determined, the liquid crystal display devices 1 to 10 according to the present invention were favorably higher in front-face contrast and lower in the color change due to viewing angle than the liquid crystal display device 13 of Comparative Example.

In addition, the display performances of the liquid crystal display devices 1 to 10 and 11 to 13 thus prepared after storage under an envrionment at 60° C. and 90% RH for 500 hours were compared. The result shows that the liquid crystal display devices 1 to 10 according to the present invention were more favorable in that the reduction of front face contrast was smaller compared to the liquid crystal display device 12 of Comparative Example.

Further, the liquid crystal display devices 1 to 10 according to the present invention were advantageous in that the moisture permeability was lower and the deterioration in display performance under high-temperature and high-humidity condition was lower, compared to the liquid crystal display device 11 of Comparative Example.

Having described our invention as related to the present embodiments, it is our intention that the present invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2009-087820 filed in Japan on Mar. 31, 2009, which is entirely herein incorporated by reference.

What is claimed is:

1. A cellulose acylate film, comprising an acyl-modified compound of a reduction product of a ketone compound-formaldehyde polymer, wherein the acyl-modified compound is a compound represented by the following Formula (I):

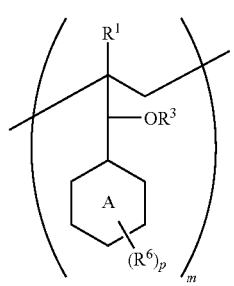

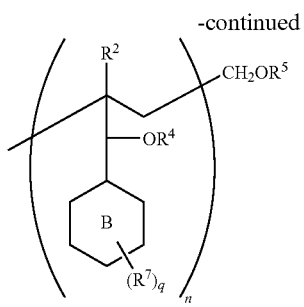

wherein, $R^1$ and $R^2$ each independently represent a hydrogen atom or an alkyl group having 1 to 4 carbon atoms; $R^3$, $R^4$ and $R^5$ each independently represent a hydrogen atom, a formyl group or an alkylcarbonyl group having 2 to 15 carbon atoms, but not all of them represent hydrogen atoms; A and B each independently represent an aryl group having 6 to 10 carbon atoms; $R^6$ and $R^7$ each independently represent a hydrogen atom, a halogen atom or an alkyl or alkoxy group having 1 to 6 carbon atoms; m and n each independently represent an integer of 0 or 1 or more, but are not 0 simultaneously; p and q are each independently 0 or an integer of 1 or 2, wherein a degree of acyl substitution of cellulose acylates in the cellulose acylate film is 2.0 to 2.97, wherein in-plane retardation (Re) and retardation in a thickness direction (Rth) of the cellulose acylate film at a measurement wavelength of 548 nm or 446 nm satisfy the relationships represented by formulae (3-c) and (4-c):

$$0.75 \leq Re(446)/Re(548) < 0.95 \quad \text{formula (3-c)}$$

$$0.75 \leq Rth(446)/Rth(548) \leq 0.95, \quad \text{formula (4-c)}$$

wherein a moisture permeability of the cellulose acylate film is 1000 to 2500 g/m²·24 h under an environment of 60° C. and 95% RH.

2. The cellulose acylate film according to claim 1, wherein the molar absorption coefficient of the acyl-modified compound of the reduction product of a ketone compound-formaldehyde polymer is 2000 or less in a wavelength range of 230 to 700 nm.

3. The cellulose acylate film according to claim 1, wherein a number average molecular weight of the acyl-modified compound of the reduction product of a ketone compound-formaldehyde polymer is 500 or more and 1500 or less.

4. The cellulose acylate film according to claim 1, wherein in-plane retardation (Re) and retardation in a thickness direction (Rth), as determined at a measurement wavelength of 548 nm, satisfy relationships represented by the following formulae (1) and (2) and both Re and Rth show higher reverse dispersibility along with the increase of wavelength measured;

$$30 \text{ nm} \leq Re(548) \leq 150 \text{ nm} \quad \text{formula (1)}$$

$$70 \text{ nm} \leq Rth(548) \leq 300 \text{ nm} \quad \text{formula (2)}$$

wherein, Re(548) and Rth(548) represent respectively the in-plane retardation and the retardation for the thickness direction at a wavelength of 548 nm.

5. A polarizing plate, comprising a polarizing film and two transparent protective films set on both sides of the polarizing film, wherein at least one of the transparent protective films is the cellulose acylate film according to claim 1.

6. A liquid crystal display device, comprising a liquid crystal cell and two polarizing plates set on both sides of the liquid crystal cell, wherein at least one of the polarizing plates is the polarizing plate according to claim 5.

7. The liquid crystal display device according to claim 6, wherein a display mode of the liquid crystal display device is a VA mode.

8. The cellulose acylate film according to claim 1, wherein in Formula (I), 50 to 100% of $R^3$, $R^4$ and $R^5$ are the formyl group or alkylcarbonyl group.

* * * * *